UNITED STATES PATENT OFFICE.

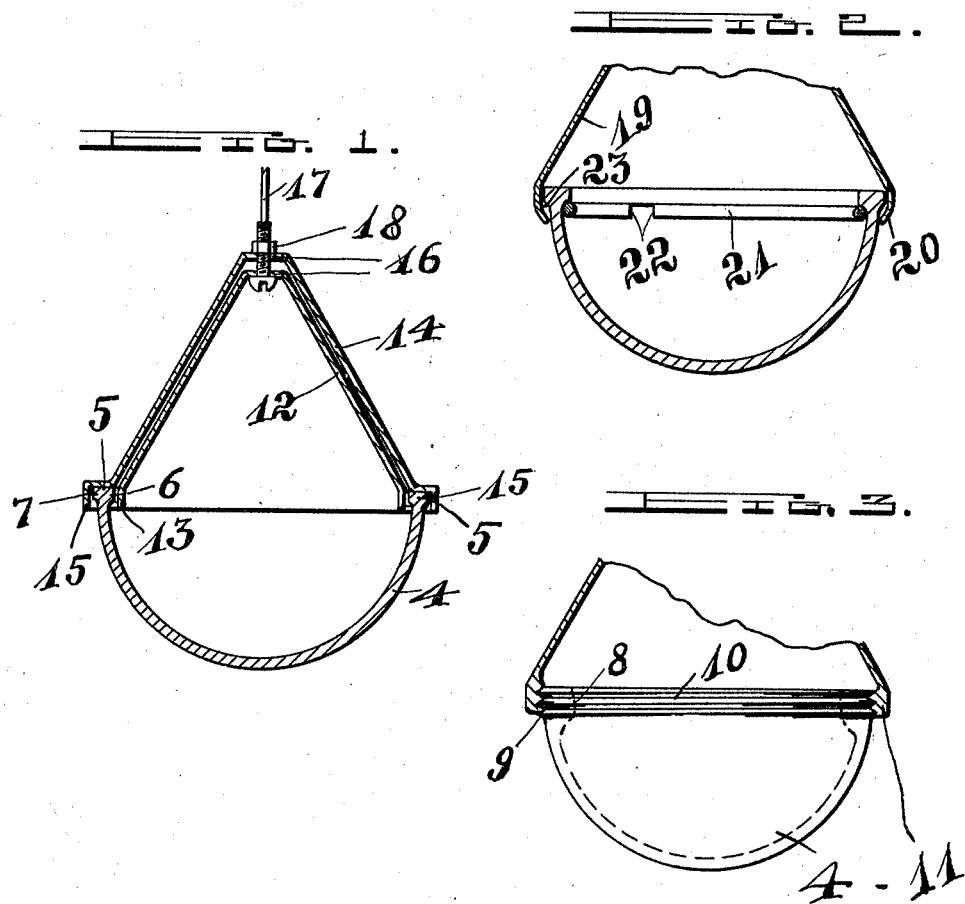

HERMAN F. RICHTER, OF LOS ANGELES, CALIFORNIA.

FLUSH-TANK VALVE.

1,315,331.  Specification of Letters Patent.  Patented Sept. 9, 1919.

Application filed November 13, 1918. Serial No. 262,600.

*To all whom it may concern:*

Be it known that I, HERMAN F. RICHTER, a citizen of the United States, residing at Los Angeles, in the county of Los Angeles and State of California, have invented new and useful Improvements in Flush-Tank Valves, of which the following is a specification.

This invention relates to valves in flush-tanks, and more particularly to rubber balls, very commonly used for closing such valves, and also relates to the connecting means for such balls.

One object of this invention is to save rubber and still have the same closing surface.

Another object is to provide simple connecting means for such valves.

Another object is to make the valves easily exchangeable, the rubber easily engaging and disengaging in relation to my improved connecting means.

Another object is to make such valves more inexpensive, while retaining the advantages of rubber balls.

Other objects will appear from the following description and the appended claims as well as from the accompanying drawing, in which—

Figure 1 is a vertical midsectional view of my improved device, illustrating a nearly or practically semi-globular part, preferably made of rubber, or similar material, and my suitably shaped caps, made of sheet metal or similar material cheaper than rubber, easily to be attached to such rubber part.

Fig. 2 is a similar view, illustrating a slight modification of the interengaging means between the semi-globular part and the cap.

Fig. 3 is another similar view, illustrating a still more slightly modified form of interengaging.

In Fig. 1, 4 designates a nearly semi-globular body preferably made of rubber or any other similar soft material easily seating itself into a valve seat such as in flush-tanks. The edge 5 of this body is provided with re-inforcements or beads 6 and 7, forming the engaging means of the body. These beads or engaging means may easily be of slightly different form, without departing from the principle of the invention, as will easily be understood. In Fig. 2, these beads are practically the same as in Fig. 1, though they are slightly differently held, as will be understood from the description later on. In Fig. 3, the inner bead 8 is slightly heavier than the bead 6 of Fig. 1, so as to form a rather strong and little resilient edge 10 on the body 4, while the outer bead 9, in this figure is forming a thread-like surface, to be screwed into the cap 11. The cap 12, in Fig. 1, is provided with an outwardly projecting rim 13, to engage with the body below the bead 6, from the inside of the body, the body being slipped over the rim 13 since, in this construction, the body is of rather soft material. The second cap 14 is provided with the rim 15 to engage over bead 7 on the body, after the inner cap 12 has been disposed as described. Both caps are provided with openings 16 through which the threaded bar 17 is inserted. Having engaged and disposed the several parts as described, the nut 18 is tightly screwed against the outside of the outer cap 14 on the threaded part of the bar 17, drawing the inner cap 12 into the outer cap 14, thereby causing the pressing of the reinforced edge 5 between the rim 13 of the cap 12 and the rim 15 of the cap 14 so as to form a water-tight interconnection between the caps and the body. This device forms then my improved valve-ball, the bar 17 being the usual operating rod in flush-tank-valves, as will easily be understood, without being illustrated in connection with such flush-tanks.

In Fig. 2, the cap 19 is provided with the slightly inwardly curved rim 20, forming the recess 23, into which the body 4 with the inserted spring 21 may easily be sprung, as will easily be understood. The spring 21 is preferably a split steel-ring, split as indicated at 22, so as to give enough when pressing the soft body 4 to be sprung into the recess 23 of the cap 19.

Both modified forms of inter-engaging as illustrated in Figs. 2 and 3, form just as well as the inter-engaging means illustrated in Fig. 1 a water-tight connection between the body and cap as the device as described in relation to the inter-engaging means in Fig. 1, as will easily be understood, and other slightly modified forms may very easily be devised without departing from the principle of the invention.

Having thus described my invention, I claim:

1. In a valve of the class described, a nearly semi-globular body made of rubber or any other similar soft material having a reinforcing edge near its open end forming the engaging means of the body, a cap having a projecting rim for engaging the inside of the reinforced edge, and another cap having a projecting rim for engaging over the outside of the reinforced edge of the body, the engaging of the two caps forming a water-tight joint between the caps and the body.

2. In a valve of the class described, a nearly semi-globular body made of rubber or any other similar soft material having a reinforcing edge near its open end forming the engaging means of the body, a cap having means for engaging the inside of the edge on the body, another cap having means for engaging the outside of the edge on the body so as to form a water-tight joint between the caps and the body, and means for holding the caps and body so water-tight engaged.

In testimony that I claim the foregoing as my invention I have signed my name in the presence of two subscribing witnesses.

HERMAN F. RICHTER.

Witnesses:
OTTO H. KRUEGER,
R. P. CONGDON.

Copies of this patent may be obtained for five cents each, by addressing the "Commissioner of Patents, Washington, D. C."